United States Patent [19]
Mayer et al.

[11] 3,840,722
[45] Oct. 8, 1974

[54] WELDING APPARATUS

[75] Inventors: Rolf Mayer; Max Speckhart, both of Giengen, Germany

[73] Assignee: Robert Bosch Hausgerate GmbH, Giengen, Germany

[22] Filed: May 25, 1973

[21] Appl. No.: 364,078

[30] Foreign Application Priority Data
June 2, 1972 Germany............................ 7220760

[52] U.S. Cl................ 219/243, 156/515, 93/DIG. 1
[51] Int. Cl. ............................................ H05b 1/00
[58] Field of Search..................... 219/243; 156/515; 93/DIG. 1

[56] References Cited
UNITED STATES PATENTS
3,035,381   5/1962   Hosso ............................ 156/515 X
3,106,630   10/1963  Klamp............................. 219/243 X
3,753,829   8/1973   Freeman............................ 156/515

Primary Examiner—C. L. Albritton
Attorney, Agent, or Firm—Michael S. Striker

[57] ABSTRACT

A welding apparatus for the welding of foils has a housing with a chamber. A welding module is accommodated in the chamber and may be removed from the latter, as well as inserted therein, in toto. The welding module has an elongated rail which serves to support at least portions of the foils to be welded. The welding module is further provided with a wire heating element for heating the foils at least in the region of the joint and with a regulator for regulating the heating element. The welding module is releasably secured to the housing of the welding apparatus by means of a screw.

8 Claims, 3 Drawing Figures

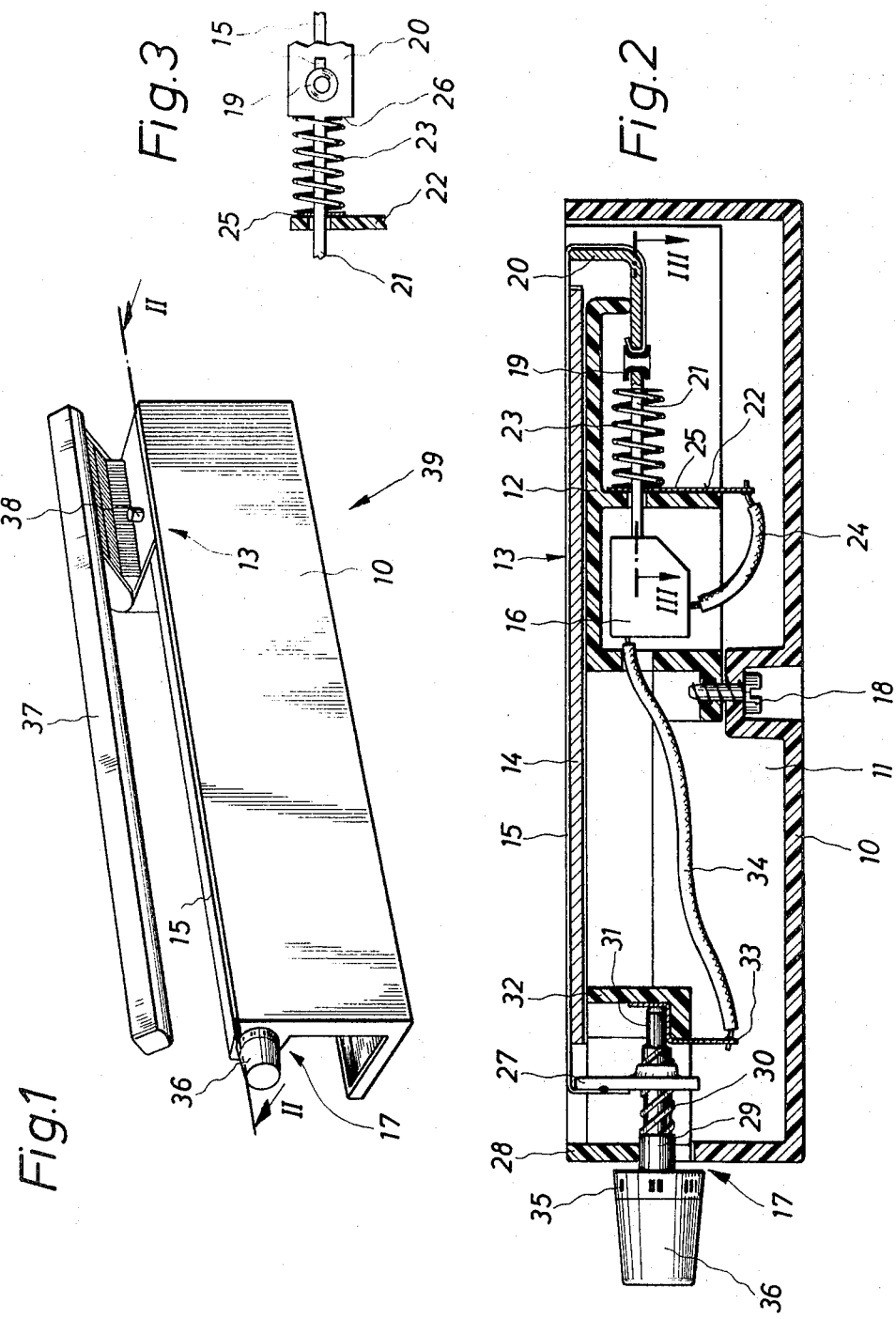

WELDING APPARATUS

BACKGROUND OF THE INVENTION

The invention relates generally to welding apparatus. More particularly, the invention relates to welding apparatus for the welding of foils and the like.

The welding apparatus of special interest in the present instance are of the type having a housing in which the component parts of the welding unit to be used with the welding apparatus are accommodated. The welding units for such welding apparatus normally consist of a support upon which the foils to be welded rest, a wire heating element, a switch and a regulating mechanism for the heating element.

In the known apparatus for the welding of foils, the housing is provided with recesses and the component parts of the welding unit are individually fitted in these recesses with close tolerance (German application No. 6,811,478). Since the welding unit is enclosed by the housing of the welding apparatus, the welding apparatus is quite simple to operate since there is then no need to deal separately with the welding unit and the remainder of the welding apparatus. However, the insertion of the component parts of the welding unit into the housing and the subsequent connection of the component parts is quite troublesome and time-consuming. Furthermore, since the recesses in the housing must be held to close tolerances, the production of the housing itself is costly. Also, since the welding unit can be tested only after its component parts have been placed in the housing and connected, the discovery of a defective welding unit would then entail either discarding the entire housing and welding unit or disconnecting the component parts of the welding unit and removing the same from the housing.

SUMMARY OF THE INVENTION

It is, accordingly, an object of the invention to provide a novel welding apparatus.

More particularly, it is an object of the invention to provide a welding apparatus, particularly for the welding of foils, sheets and like articles, which is simpler and cheaper to manufacture than has been possible heretofore.

A further object of the invention is to provide a welding apparatus, particularly for the welding of foils, sheets and like articles, which is very simple in its operation.

Another object of the invention is to provide a welding apparatus, particularly for the welding of foils, sheets and like articles, whereby the welding unit of the welding apparatus may be quality control tested prior to insertion of the welding unit in or securing of the welding unit to the housing of the welding apparatus.

An additional object of the invention is to provide a welding apparatus, particularly for the welding of foils, sheets and like articles, whereby close tolerance recesses in the housing of the welding apparatus are not required for accommodating the component parts of the welding unit.

Yet another object of the invention is to provide a welding unit which may be readily placed in or secured to the housing of a welding apparatus.

In accordance with these and other objects which will become apparent, the invention provides a welding apparatus, particularly for the welding of foils, sheets and like articles, which comprises a housing having a chamber. A welding module is accommodated in the chamber and is adapted for removal therefrom and insertion therein in toto. The welding module includes supporting means for supporting at least portions of articles to be welded, heating means for heating articles to be welded at least in the region of the joint and regulating means for regulating the heating means. The welding module is releasably secured to the housing of the welding apparatus by securing means.

Since, according to the invention, the welding unit is in the form of a module, that is, the component parts of the welding unit form a complete unit, it wil be appreciated that the provision of close tolerance recesses in the housing of the welding apparatus for accommodating the individual component parts of the welding unit is not necessary. The welding module may be inserted in or removed from the housing of the welding apparatus in toto. In accordance with an advantageous modification of the invention, the welding module is provided with at least one support frame and the component parts of the welding module, i.e. the supporting means, heating means and regulating means, are connected with the support frame. It is further favorable when the support frame is composed of a synthetic resin and when the support frame is releasably secured to the housing of the welding apparatus by the securing means.

Due to fact that the welding unit is in the form of module according to the invention, the assembly of the component parts of the welding unit, as well as the quality control testing of the welding unit, may be performed exteriorly of the housing of the welding apparatus. Furthermore, the dimensional tolerances of the housing of the welding apparatus may be relatively large since the housing serves only to accommodate the welding module, and the component parts of the latter need not be individually placed in the housing. The production costs for the housing are, therefore, relatively low so that housings of different outer configurations and having a welding module mounted therein or thereon may be manufactured quite cheaply. Housings of various outer configurations may be desirable in order to obtain better product distinction, for example.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a general view of a welding apparatus according to the invention having a welding module mounted thereon;

FIG. 2 is a longitudinal section as viewed in the direction of the arrows II—II of FIG. 1; and FIG. 3 is a section as viewed in the direction of the arrows III—III of FIG. 2.

DESCRIPTION OF THE PREFERRED EMBODIMENTS

Referring first to FIGS. 1 and 2, a welding apparatus according to the invention is indicated generally at 39 and has a housing 10 which is provided with a chamber or recess 11. Accommodated in the recess 11 is a support frame 12 to which is connected a welding unit 13. The support frame 12 is preferably composed of a synthetic resin and the support frame 12 and welding unit 13 which is connected with it together form a welding module. The welding unit 13 includes an elongated support rail or bar 14 upon which at least a portion of an article to be welded such as, for example, a foil, sheet or the like, may rest. The welding unit 13 also includes a heating element 15 for heating articles to be welded at least in the region where a welded joint is to be produced. The heating element 15 is here illustrated as being in the form of a wire. A switching mechanism 16 and a regulating mechanism 17 for regulating the heating element 15 also form part of the welding unit 13. The support frame 12 to which the welding unit 13 is connected is releasably secured to the housing 10 in any suitable manner and the connection between the support frame 12 and the housing 10 is shown here as being effected via a screw 18.

The heating element 15, which may be covered with a foil or coating of polytetrafluoroethylene, rests on the support rail 14, that is, a major portion of the length of the heating element 15 rests on the support rail 14. One end portion of the heating element 15 is connected with the regulating mechanism 17 whereas the other end portion of the heating element 15 is connected to a contact part or section 20 of the switching mechanism 16 via a tubular rivet or pin 19.

The contact section 20 has a projection 21 which passes through an intermediate or dividing wall portion 22 of the support frame 12. The non-illustrated end portion of the projection 21 projects into the switching mechanism 16. A contact plate 25 abuts the intermediate wall portion 22 of the support frame 12 and is connected with the switching mechanism 16 via an electrically insulating wire 24. A helical expansion spring 23 is provided on the projection 21 of the contact section 20 and, as best seen in FIG. 3, the spring 23 bears against the contact plate 25 on one side and against the two shoulders 26 of the contact section 20 on the other side. The width of the shoulders 26 of the contact section 20 approximates the outer diameter of the spring 23. The spring 23 serves to stress the heating element 15 in tension.

The regulating mechanism 17 includes an adjusting portion 27 to which the heating element 15 is secured. An adjusting screw 29 is rotatably mounted in an outer wall portion 28 of the support frame 12 and passes through the adjusting portion 27. The adjusting screw 29 is provided with an outer thread 30 which latter mates with a corresponding thread provided inside the passage of the adjusting portion 27 through which the adjusting screw 29 passes. Thus, rotation of the adjusting screw 29 effects a displacement of the adjusting portion 27 in a direction along the elongation of the heating element 15. The adjusting screw 29 is in electrical contact with the adjusting portion 27.

The support frame 12 has another intermediate or dividing wall portion 32 and a contact plate 33 lies thereagainst. The contact plate 33 is connected with the switching mechanism 16 via an electrically insulating wire 34. The adjusting screw 29 which, as already mentioned, is in electrical contact with the adjusting portion 27, is provided with a peg-like or pin-like protuberance 31 which extends in axial direction thereof. The protuberance 31 abuts the contact plate 33 so that the adjusting screw 29 is braced against the latter. One end of the adjusting screw 29 protrudes outwardly from the support frame 12, i.e., through the outer wall portion 28 of the support frame 12, and this end of the adjusting screw 29 carries a rotatable knob 36 which is provided with calibration markings 35.

In operation, articles to be welded to one another such as, for example, synthetic resin foils, are placed over the heating element 15. A pressing bar or plate 37 hingedly connected to the housing 10 of the welding apparatus 39 serves to press the articles against the heating element 15. When the articles are pressed against the heating element 15, a push button 38 with which the welding apparatus 39 is provided is depressed by the pressing bar 37. Depression of the push button 38 activates a non-illustrated switch which, in turn, causes the primary circuit of a non-illustrated transformer to be closed or completed. The heating element 15, which is connected to the secondary circuit of the transformer in known manner, heats up after closing of the primary circuit and thereby enables the articles to be welded to one another. Simultaneously, the heating element 15 expands as a result of the heating to which it is subjected. Although the heating element 15 expands upon being heated, the stress therein may be maintained substantially constant by a corresponding expansion of the spring 23. When the stress in the heating element 15 is maintained substantially constant in this manner, the expansion of the spring 23 causes that end portion of the projection 21 of the contact section 20 which projects into the switching mechanism 16 to move in a direction towards the intermediate wall portion 22 of the support frame 12. When the heating element 15 has expanded by a predetermined amount, a non-illustrated contact switch provided in the switching mechanism 16, which switch is closed in its rest position, opens and thereby interrupts the primary circuit of the transformer. As a result, current will no longer be supplied to the heating element 15 and heating of the latter will stop. Thus, the heating element 15 will cool and, concomitantly, contraction of the same will occur.

If the pressing bar 37 is maintained in contact with the push button 38 so that the latter remains depressed and the primary circuit of the transformer remains closed thereby, then the non-illustrated contact switch of the switching mechanism 16 will again be closed after cooling and a predetermined amount of contraction of the heating element 15 have occurred, and the welding operation will be repeated. This is a result of the fact that contraction of the heating element 15 permits the spring 23 to contract which, in turn, causes the projection 21 of the contact section 20 to move towards the switching mechanism 16. This repetition of the welding operation at short intervals when the push button 38 is maintained in its depressed position enables even articles of relatively large thickness to be welded to one another. Only when the pressing bar 37 is released and permitted to pivot from its closed or operating position, wherein it lies adjacent the heating element 15 and the support rail 14 of the welding unit 13, to its open position, wherein it is displaced from the support rail 14 and the heating element 15, is the primary circuit of the transformer broken or opened and is the repetition of the welding operation discontinued.

Pivoting of the pressing bar 37 from its closed position, where the push button 38 is depressed, to its open position, where the push button 38 is no longer depressed, may be effected by means of a non-illustrated helical spring which bears against the pressing bar 37 on one side and against the housing 10 of the welding apparatus 39 on the other side.

By rotating the knob 36 connected with the adjusting screw 29, the adjusting portion 27 of the regulating mechanism 17 may be displaced and such a displacement is transmitted to the projection 21 of the contact section 20 via the heating element 15. Thus, depending upon the direction of rotation of the knob 36, the projection 21 of the contact section 20 may be displaced in a direction either inwardly or outwardly of the switching mechanism 16, i.e., either towards or away from the switching mechanism 16, and, in this manner, the switching point of the switching mechanism 16 may be changed. Consequently, depending upon the direction of rotation of the knob 36, either a larger or a smaller expansion of the heating element 15 will be required to open the contact switch of the switching mechanism 16, that is, the heating element 15 must be heated to a greater or a lesser extent in order to effect opening of the contact switch of the switching mechanism 16. This enables thicker or thinner articles to be welded to one another.

It will be appreciated that the applications of the novel welding apparatus are not limited to welding different articles to one another. For example, the welding apparatus may equally well be used for closing plastic bags or the like in which food or other perishables are to be stored.

It will be understood that each of the elements described above, or two or more together, may also find a useful application in other types of constructions and uses differing from the types described above.

While the invention has been illustrated and described as embodied in a welding apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A welding apparatus, particularly for the thermal welding of foils, sheets and like articles, comprising a housing having a chamber; a welding module installed in said chamber, said module being removable from and reinsertable into said chamber as a unit and including means for supporting at least portions of articles to be welded, heating means connected to said supporting means for heating the articles at least in the regions where a welded joint is to be produced, and regulating means secured to said supporting means for regulating the heating action of said heating means upon the articles to be welded; and means for releasably securing said welding module as a unit to said housing, said securing means including an externally threaded member and a mating internally threaded member, one of said members being provided on said housing and the other of said members being provided on said module.

2. A welding apparatus as defined in claim 1, wherein said regulating means comprises a switch for activating and de-activating said heating means.

3. A welding apparatus as defined in claim 2, wherein said heating means expands upon heating and contracts upon cooling, said switch being responsive to expansion and contraction of said heating means so that when the latter expands by a predetermined amount said switch de-activates said heating means, and when said heating means subsequently contracts by a predetermined amount said switch re-activates said heating means.

4. A welding apparatus as defined in claim 1, wherein said supporting means comprises an elongated rail.

5. A welding apparatus as defined in claim 1, wherein said heating means comprises a wire heating element.

6. A welding apparatus as defined in claim 1, wherein said welding module further comprises at least one support frame, and wherein said supporting means, said heating means and said regulating means are connected with said support frame.

7. A welding apparatus as defined in claim 6, wherein said securing means releasably secures said support frame to said housing.

8. A welding apparatus as defined in claim 6, wherein said support frame is composed of a synthetic resin.

* * * * *